(12) United States Patent  
Horne

(10) Patent No.: US 8,658,124 B1  
(45) Date of Patent: Feb. 25, 2014

(54) PROCESS FOR THE MANUFACTURING OF FERRIC SULFATE

(71) Applicant: Ronald L. Horne, San Felipe, TX (US)

(72) Inventor: Ronald L. Horne, San Felipe, TX (US)

(*) Notice: Subject to any disclaimer, the term of this patent is extended or adjusted under 35 U.S.C. 154(b) by 0 days.

(21) Appl. No.: 13/856,505

(22) Filed: Apr. 4, 2013

Related U.S. Application Data

(60) Provisional application No. 61/620,136, filed on Apr. 4, 2012.

(51) Int. Cl.
*C01G 1/10* (2006.01)
*C01G 49/14* (2006.01)

(52) U.S. Cl.
USPC .......................................................... 423/558

(58) Field of Classification Search
USPC .......................................................... 423/558
See application file for complete search history.

(56) References Cited

U.S. PATENT DOCUMENTS 4,814,158 A * 3/1989 Everill .......................... 423/558

* cited by examiner

*Primary Examiner* — Timothy Vanoy
(74) *Attorney, Agent, or Firm* — Egbert Law Offices, PLLC

(57) ABSTRACT

A process for manufacturing ferric sulfate has the steps of introducing water into an interior of a pressure vessel, introducing an iron material into the interior of the pressure vessel, mixing the iron material and the water within the interior of the pressure vessel, adding sulfuric acid to the mixed iron material and water, agitating the iron material and the sulfuric acid and the water for a period of time so as to increase a temperature of a reaction and a pressure of the reaction within the interior of the pressure vessel, and discharging ferric sulfate from the interior of the pressure vessel. The iron material can be either hematite or magnetite. Oxygen can be introduced into the interior of the pressure vessel if the iron material is magnetite.

20 Claims, 2 Drawing Sheets

PROCESS FOR THE MANUFACTURING OF FERRIC SULFATE

RELATED U.S. APPLICATIONS

The present application claims priority from U.S. Provisional Patent Application Ser. No. 61/620,136, filed on Apr. 4, 2012, and entitled "Process for the Manufacturing of Ferrous Sulfate".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to apparatus and methods of manufacture of ferric sulfate. In particular, the present invention relates to batch-style processes in which ferric sulfate is produced from a single pressure vessel. Additionally, the present invention relates to processes for the manufacture of ferric sulfate which avoid the introduction of external heat to the process.

2. Description of Related Art Including Information Disclosed Under 37 CFR 1.97 and 37 CFR 1.98

Ferric sulfate [$Fe_2(SO_4)_3$] is a commonly-used material of commerce. It finds use in, for example, potable water and sewage treatment processes, where it acts as a flocculant to remove suspended particles in the water. Furthermore, ferric sulfate is a useful precursor to other commonly-used materials of commerce. For example, roasting of ferric sulfate yields ferric oxide and sulfur trioxide gas, while hydration of sulfur trioxide gas yields sulfuric acid.

In the past, ferric sulfate has been produced in a one or two staged process. Initially, the iron ore is mixed with water and sulfuric acid in a digester container. This digester container is heated to approximately 230° F. and exposed to atmospheric pressure. The product of this process is ferrous sulfate and ferric sulfate which is then passed to an oxidizer. The oxidizer is a separate pressure vessel that allows oxygen to be introduced to the ferrous sulfate at approximately 60 p.s.i. As a result, ferric sulfate is produced as a product of this process.

Unfortunately, this process is relatively expensive. Initially, a pair of vessels can be required for the process. The digester is a relatively large vessel that can occupy a great deal of space within a production facility. The oxidizer is a relatively expensive pressure vessel. Since heat may be applied to the digester, the cost of fuel used to heat the digestion process can be considerable. As such, the prior art process that are employed for the production of ferric sulfate do not optimize the cost and capital expenditure associated with the production of such ferric sulfate.

In the past, various patents have issued relating to the production of ferric sulfate. For example, an early patent was U.S. Pat. No. 2,196,584, issued to A. E. Edison on Apr. 9, 1940. This patent describes a process for producing ferric sulfate in which ferrous sulfate is slurried in a sulfuric acid solution to make a slurry containing no substantial excess of water over that required to make the slurry fluid at all times. The ferrous sulfate in the slurry is oxidized with nitric acid. The oxidation occurs at a temperature above about 60° C.

U.S. Pat. No. 2,252,332, issued on Aug. 12, 1941 to J. K. Plummer, shows a process of making ferric sulfate in which iron sulfide ores are roasted in a furnace. The dust from the furnace gasses that contain insoluble ferric oxide are collected and mixed with sulfuric acid. Water is added to the mixture. The mixture is stirred without the application of external heat until the reactor is raised to a temperature of approximately 310° F. The heat of reaction is held within the mixture by placing it in a heat-insulated chamber.

U.S. Pat. No. 2,306,425, issued on Dec. 29, 1942 to J. G. Bevan, provides a process for the production of ferric sulfate in which an aqueous solution of ferric sulfate is passed downwardly through a packed tower containing metallic iron so as to reduce the iron of the ferric sulfate and oxidize the metallic iron with the production of a solution of ferric sulfate in the upper portion of the tower. Gases containing sulfur dioxide and oxygen are passed upwardly through the tower in contact with the downwardly flowing solution so as to oxidize the ferrous sulfate and produce a solution in ferric sulfate in a lower portion of the tower.

U.S. Pat. No. 3,954,953, issued on May 4, 1976 to Satterwhite et al., describes an energy-conserving process for the manufacturing of ferric sulfate. At an initial aqueous phase of the process, a low water-containing slurry or dispersion of iron oxide is reacted with only a portion of the total sulfuric acid required in the process to produce a ferric sulfate-containing slurry having unreacted iron oxide. A quantity of acid withheld from the aqueous phase is employed at the time of agglomeration of the ferric sulfate-containing slurry. The delay of the use of the remaining acid to a later step in the process allows the heat of reaction generated in the conversion of the unreacted iron oxide in the slurry to be utilized for completing the reaction and for drying the granules.

U.S. Pat. No. 4,036,941, issued on Jul. 19, 1977 to Boyles et al., shows the preparation of ferric sulfate solutions by a process for recovery of iron from an iron mud. The iron mud contains a mixture of gypsum and ferric hydroxide. The gypsum and the ferric hydroxide mixture is contacted with sulfuric acid of a concentration between 93 and 98 percent for a period of one to twelve hours. The undissolved material is removed and recovered as a 25 to 50 percent ferric sulfate solution.

U.S. Pat. No. 4,707,349, issued on Nov. 17, 1987 to N. B. Hjersted, provides a process of preparing a preferred ferric sulfate solution and product. Iron oxides or iron are dissolved in sulfuric acid to form ferrous sulfate. The ferrous sulfate is partially oxidized to ferric sulfate in the presence of dissolved oxygen. In a second stage of oxidation, the remaining ferrous sulfate is oxidized to ferric sulfate by the action of a non-molecular oxygen-oxidizing agent, such as hydrogen peroxide. During both stages of oxidation, a catalyst, such as copper sulfate or copper ammonium sulfate, is used.

U.S. Pat. No. 4,814,158, issued on Mar. 21, 1989 to N. R. Everill, describes a process for making liquid ferric sulfate from finely-divided ferric oxide, sulfuric acid and water. This is carried out in a closed reaction vessel at temperatures ranging from about 130° C. to about 150° C. and at pressures from about 30 p.s.i. to about 40 p.s.i. The reaction time ranges from four to eight hours.

U.S. Pat. No. 5,194,240, issued on Mar. 16, 1993 to J. R. Derka, provides the process of the manufacture of ferric sulphate from ferrous sulphate in a closed circuit or vessel having a liquid phase and a vapor phase. The vapor phase is a closed system. The process provides oxidation between about 70° C. to about 150° C. of the iron under pressure utilizing oxygen in the closed circuit and $NO_x$ as a catalyst. U.S. Pat.

No. 5,332,565, issued on Jul. 26, 1994 to J. R. Derka, shows a similar process as that of U.S. Pat. No. 5,194,240, U.S. Pat. No. 5,624,650, issued on Apr. 29, 1997 to McEwan et al., shows a nitric acid process for ferric sulfate production. Ferric sulfate is produced by treating ferric ammonium sulfate, ammonium jarosite, or a similar iron complex with nitric acid. The ferric ammonium sulfate or ammonium jarosite can be formed by treating a sulfuric acid leaching solution with a solution of ammonium nitrate. Upon addition of dilute nitric acid at a temperature of about 60° C., ferric sulfate forms and is recovered.

U.S. Pat. No. 5,766,566, issued on Jun. 16, 1998 to Mattila et al., provides a process for preparing ferric sulfate by forming a slurry which contains ferrous sulfate and sulfuric acid. The slurry contains bivalent iron in both the solution phase and the solid phase. The slurry is oxidized to form a ferric sulfate slurry. The ferric sulfate slurry is solidified to form solid ferric sulfate.

U.S. Pat. No. 6,375,919, issued on Apr. 23, 2002 to Kakio et al., teaches a method for the manufacture of ferric sulfate solution and a water treatment agent using the same. Iron ore containing 30 percent of FeOOH as a trivalent iron is calcined at 200-600° C. and then dissolved in sulfuric acid.

U.S. Pat. No. 7,067,100, issued on Jun. 27, 2006 to Faigen et al., describes a liquid ferric sulfate manufacturing process. This liquid ferric sulfate is produced from finely-divided ferric oxide, sulfuric acid and water in a closed reaction vessel at temperatures ranging from about 130° C. to about 150° C. and pressures from about 30 p.s.i. to about 70 p.s.i. The reaction time ranges from four to eight hours and produces liquid ferric sulfate having at least 10 percent trivalent iron. U.S. Pat. No. 7,387,770, issued on Jun. 17, 2008 to Wilkinson et al., shows a process similar to that of U.S. Pat. No. 7,067,100

It is an object of the present invention to provide a method for manufacturing ferric sulfate in which the digestion and oxidation processes can occur in a single operation.

It is another object of the present invention to provide a process for the production of ferric sulfate in which the ferric sulfate is produced economically and optimally.

It is another object of the present invention to provide a process for the production of ferric sulfate that allows ferric sulfate to be produced from hematite without introduction of oxygen.

It is still another object of the present invention to provide a process for the manufacture of ferric sulfate which minimizes heat addition from external sources.

It is still a further object of the present invention to provide a process for the manufacture of ferric sulfate that reduces the time for digestion.

It is still another object of the present invention to provide a process for the manufacture of ferric sulfate which allows the process to be carried out in a single vessel without the need for separate vessels for digestion and oxidization.

These and other objects and advantages of the present invention will become apparent from a reading of the attached specification and appended claims.

BRIEF SUMMARY OF THE INVENTION

The present invention is a process for producing ferric sulfate. The process of the present invention includes the steps of: (1) forming a pressure vessel having an interior volume; (2) adding water to the internal volume of the pressure vessel; (3) agitating the water within the interior volume of the pressure vessel; (4) adding an iron ore to the agitated water and continuing to agitate; (5) adding sulfuric acid to the agitated iron ore and water; (6) mixing the sulfuric acid and the agitated iron ore and water for a period of time; and (7) discharging ferric sulfate from the pressure vessel.

In the process of the present invention, the iron ore that is added to the agitated water can be either hematite ($Fe_2O_3$) or magnetite ($Fe_3O_4$). If magnetite is the iron ore that is added to the agitated water, then the process of the present invention also includes the step of introducing oxygen into the interior of the pressure vessel.

The mixture of the sulfuric acid, the iron ore and the water is carried out over a period of time so as to produce a temperature of 240° and 300° F. and a pressure of 20 to 90 p.s.i., and possibly higher. The reaction of the water with the sulfuric acid and iron serves to chemically cause the increase in temperature and pressure within the pressure vessel.

A pump can be used to discharge the ferric sulfate from the pressure vessel. The pump can deliver the ferric sulfate to a vessel exterior of the pressure vessel. The pump can also be used to recirculate oxygen back into the interior of the pressure reactor.

Within the method of the present invention, water can be added to the pressure vessel at the end of the reaction so as to dilute the ferric sulfate so as to avoid solidification. As such, the ferric sulfate can be discharged from the pressure vessel in a highly efficient and effective manner.

In the preferred embodiment of the present invention, the pressure vessel will have a closed interior with an ore inlet, water inlet and an acid inlet. The agitator is in the nature of a blade or an impeller that has a shaft connected to a motor. The motor can be positioned exterior of the pressure vessel. The agitator should have a sufficient capacity to effectively mix the contents on the interior of the pressure vessel. The pressure vessel can be jacketed and insulated. If necessary, the jacketing can include suitable heat exchange lines therethrough. As such, if external heat is required for the effectiveness of the process, then heated water, or other fluids, can be passed through the heat exchange tubes in the jacket of the reactor so as to, by heat exchange relationship, increase the temperature on the interior of the pressure vessel. Ideally, the pressure vessel is formed of a corrosion-resistant material and is capable of withstanding an interior pressure of 150 p.s.i.g. and a temperature of up to 550° F. The pressure reactor can include suitable vents so as to release gases from the interior of the pressure vessel if the interior pressure exceeds a predetermined value. An eductor can be connected to the pump so as to cause the oxygen to be delivered back into the interior of pressure vessel.

The foregoing Section is intended to describe, in generality, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
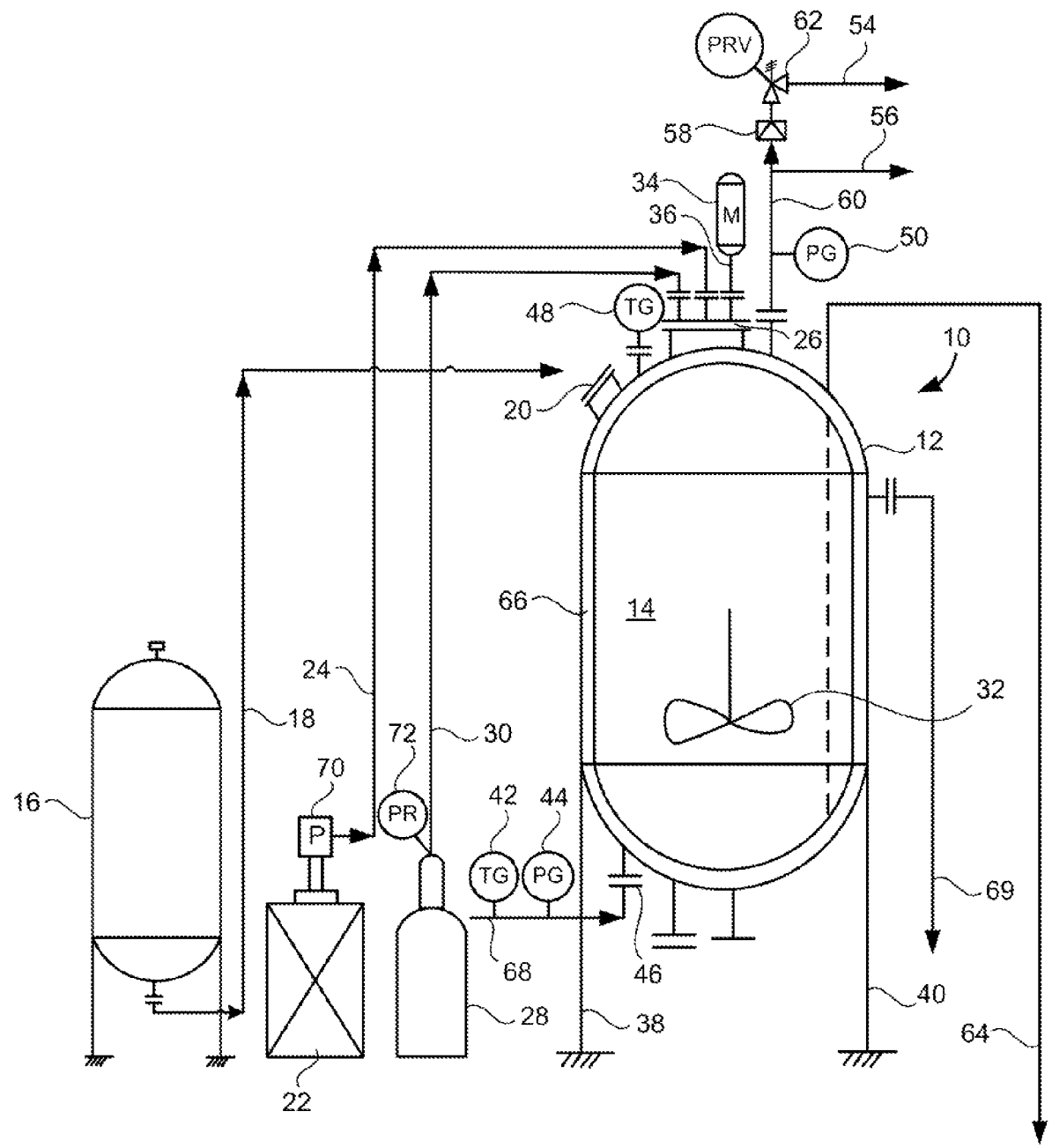
FIG. 1 is a diagrammatic illustration of the process for the manufacture of ferric sulfate in accordance with a simplified embodiment of the present invention.

Referring to FIG. 1, there is shown the process 10 for the production of ferric sulfate in accordance with a simplified embodiment of the present invention. The process 10 includes a pressure vessel 12 having an interior volume 14 formed therein. A water tank 16 is connected to the pressure vessel 12 so as to deliver water along line 18 through the inlet 20 of the pressure vessel 12. An acid tank 22 is connected the pressure vessel 12 along line 24 so as to allow sulfuric acid to be introduced through the port 26 at the top of the pressure vessel 12. An oxygen tank 28 is connected along line 30 to the port 26 of the pressure vessel 12 so as to allow oxygen to be introduced into the interior volume 14 of the pressure vessel 12.

As can be seen in FIG. 1, the pressure vessel 12 is a closed vessel having an interior volume 14. An agitator 32 is located in the interior volume 14 of the pressure vessel 12. Motor 34 is connected by a shaft 36 to the agitator 32. The agitator 32 can be in the nature of a blade, an impeller, a fan, a circulation system or other device that can effectively agitate the contents of the interior volume 14 of the pressure vessel 12.

The pressure vessel 12 is supported by legs 38 and 40 upon a floor. The integrity of the pressure vessel 12 is effectively protected by the use of relief vent 54 and reactor vent 56. A rupture disc 58 is located along line 60. Similarly, a relief valve 62 is also positioned on the line 60. If the pressure in the interior volume 14 should become too great, then the relief valve 62 will open and/or the disc 58 will become ruptured and gas can pass through the reactor valve 56 and outwardly of the pressure vessel 12.

The pressure vessel 12 includes an outlet 64 that allows for the removal of the ferric sulfate therefrom.

A temperature gauge 42 and a pressure gauge 44 are connected by a flange 46 to a line connected to a jacket 66 of the pressure vessel 12. The temperature gauge 42 and the pressure gauge 44, respectively, provide the user with relevant information as to the temperature and pressure of the fluid that is supplied to the jacket of the pressure vessel 12. Another temperature gauge 48 is provided at the top of the pressure vessel 12. Similarly, a pressure gauge 50 is also provided at the top of the pressure vessel 12. These gauges 48, 50 and 52 can provide the user with an indication of the relevant pressure, temperature, and vacuum within the interior volume 14.

The pressure vessel 12 is, in the preferred embodiment, formed of a corrosion-resistant material, such as stainless steel. Specifically, the pressure vessel 12 should have a capacity to withstand pressures of up to 150 p.s.i.g. and temperatures of up to 550° F.

Within the concept of the present invention, the heat of reaction of the various components that are introduced in the interior volume 14 of the pressure vessel 12 should be sufficient to carry out the process. However, if it is necessary to add additional heat in order to facilitate the process, the jacket 66 of the pressure vessel 12 can include heat exchange tubes therearound. As such, it is possible to introduce hot water or steam through line 68 into the heat exchange tubes of the jacket 66. Line 68 has a temperature gauge 42 and a pressure gauge 44 thereon. A flange 46 serves to connect the line 68 to the heat exchange tubes within the jacket 66. The heat exchange tubes will have an outlet 69 so as to allow the cooled steam or water to be removed from the heat exchange tubes within the jacket 66. This water or steam can be recirculated, if required.

In the process illustrated in FIG. 1, water from the water tank 16 is initially introduced through the inlet 20 into the interior volume 14 of the pressure vessel 12. The water can be in the nature of tap water or any other water source. A suitable pump (not shown) may employed so as to deliver the water in a sufficient quantity into the interior volume 14.

Once the water is introduced into the interior volume 14, the agitator 32 is rotated so as to agitate the water therein. The iron ore can then be introduced through the inlet 20 into the interior volume 14. The agitator 32 serves to mix the powdered iron ore with the water. Since the iron ore is introduced through the inlet 20 as the agitator 32 is rotating, the iron ore, or other iron source, will be continuously mixed. The sulfuric acid from the acid tank 22 can then be pumped by pump 70 through line 24 through the port 26 and into the interior volume 14. The acid is sulfuric acid and/or hydrochloric acid. The agitator 32 will serve to mix the sulfuric acid with the water and the iron ore for a period of time. As a result of this mixture, the digestion process will be pressurized by the reaction up to 90 p.s.i. or more. Additionally, the temperature of the reaction will be between 240° and 300° F. The pressure and the temperature allows the time for the digestion to be minimized.

If the temperature reaches 260° F., then it is believed that the digestion process can be carried out in as little as one hour of mixing time. A temperature of 240° F. will allow the digestion process to be carried out within four hours. The chemical reaction actually provides the heat. The pressure in the pressure vessel maintains the heat and allows the temperature to increase so as to speed the digestion. As a result, there should be no need to apply external heat to the process. The pressures within the interior volume 14 can be suitably adjusted to keep the ferric sulfate from being solidified. After the reaction is completed. The ferric sulfate can then be discharged through line 64. This process, as described hereinabove, is particularly applicable where hematite is the iron ore.

In the event that magnetite is the iron ore, then it is necessary to add oxygen from the oxygen tank 28. The oxygen tank 28 can include a pressure relief valve 72 thereon. The oxygen will pass through line 30 through the port 26 and into the interior volume 14. As a result, the agitator 32 can intimately mix the magnetite, the water, the sulfuric acid and the oxygen. This allows the ferrous sulfate to be oxidized into ferric sulfate within the interior volume 14.

When magnetite is used in the process, it may be necessary to use a circulation pump to introduce oxygen into the solution in the pressure vessel. In the present invention, by agitating the contents and introducing oxygen into the top of the vessel, the present invention is able to react out the ferrous with the oxygen in the absence of an eductor so as to oxidize to ferric sulfate.

Figure 2:
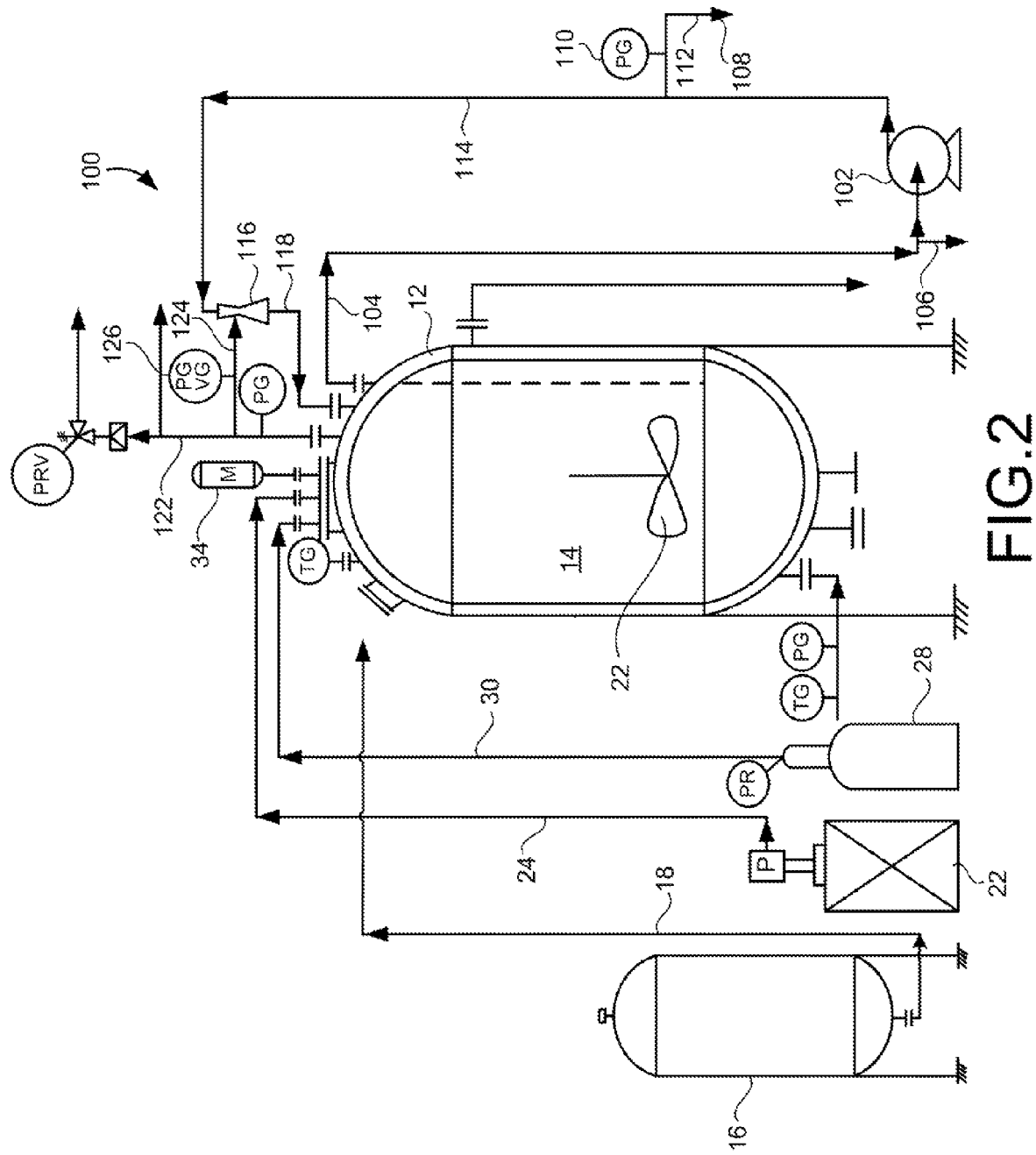
FIG. 2 is a diagrammatic illustration of the process for the manufacturing of ferric sulfate according to a preferred embodiment of the present invention.

FIG. 2 shows a process 100 of the preferred embodiment of the present invention. The process 100 includes the additional component of recycling the oxygen back into the interior volume 14 of the pressure vessel 12. It can be seen that the process 100 includes the water tank 16, the acid tank 22, and the oxygen tank 28 as shown in the preferred embodiment of FIG. 1. The various lines 18, 24 and 30 serve to connect the water tank 16, the acid tank 22 and the oxygen tank 28 to the interior volume 14 of the pressure vessel 12. The pressure vessel 12 also includes an agitator 22 therein that is driven by motor 34.

In the process illustrated by FIG. 2, a pump 102 is utilized so as to discharge the contents in the interior volume 14 of the pressure vessel 12. The line 104 will extend into the interior volume 14 toward a bottom of the pressure vessel 12. As a result, the ferric sulfate and ferrous sulfate solution are drawn outwardly of the pressure vessel 12. A sample port 106 is connected to line 104 so that samples of the ferric sulfate can be obtained prior to reaching the reactor pump 102. The reactor pump 102 will deliver the ferric sulfate through the product outlet 108. A pressure gauge 110 is connected along the line 112 toward the product outlet 108. Line 114 will extend from the reactor pump 102 so as to pass oxygen to an eductor 116. The eductor 116 serves to create a venturi-type effect whereby oxygen can be delivered along line 118 back to the interior volume 14 of the pressure vessel 12. As a result, the eductor 116 will increase the velocity of the oxygen passing through line 118 so that the oxygen further agitates the solution within the interior volume 14 while intimately mixing the oxygen with the contents of the interior volume 14. The gas in the interior volume 14 of the pressure vessel 12 passes outwardly along line 122 back along line 124 so as to be received by the eductor 116 and facilitate this venturi-type flow of oxygen. A gauge 126 is connected along line 124 so as to allow for a proper monitoring of the pressure in line 124.

In this embodiment of the present invention, the oxygen is effectively pulled from the process and reintroduced back into the interior volume 14. As such, the oxygen component of the process is further utilized by the output of the process. Additionally, it enhances the efficiency of the operation by further mixing oxygen with the agitated contents in the interior volume 14 of the pressure vessel 12.

The process of the present invention allows for ferric sulfate to be produced in a single operation. The present invention allows the digestion process and the oxidation process to occur simultaneously within a single pressure vessel. As a result, it is not necessary to have separate tanks for the digestion process and the oxidation process. The ferric sulfate can be produced from hematite without the introduction of oxygen thereto. Since the production of ferric sulfate occurs by way of the heat of dilution of the sulfuric acid and water, the present invention eliminates the need to introduce external heat or, at least, minimizes the requirements for external heat. As such, the present invention avoids the additional costs associated with providing fuel for the production of this heat. The pressure and temperature within the interior volume 14 of the pressure vessel 12 reduce the time for the digestion process to occur. As a result of the process of the present invention, a quantity of ferric sulfate can be produced with a smaller pressure vessel and smaller footprint than that of the prior art.

If the hydrochloric acid is used as the acid, the resulting product is ferric chloride. As such, it is believed that the process of the present invention is equally applicable for the production of ferric chloride or a blend of ferric chloride or ferric sulfate.

The foregoing disclosure and description of the invention is illustrative and explanatory thereof. Various changes in the details of the described process can be made within the scope of the present invention without departing from the true spirit of the invention. The present invention should only be limited by the following claims and their legal equivalents.

I claim:

1. A process for manufacturing ferric sulfate comprising:
   introducing water into an interior of a pressure vessel;
   introducing an iron material into said interior of said pressure vessel;
   mixing said iron material and said water within said interior of said pressure vessel;
   adding sulfuric acid to the mixed iron material and water;
   agitating said iron material and said sulfuric acid and said water for a period of time so as to increase a temperature of a reaction thereof and a pressure of the reaction within said interior of said pressure vessel so as to produce ferric sulfate; and
   discharging ferric sulfate from said interior of said pressure vessel.

2. The process of claim 1, said iron material being hematite.

3. The process of claim 1, said iron material being magnetite.

4. The process of claim 2, further comprising:
   introducing oxygen into said pressure vessel.

5. The process of claim 1, the step of agitating comprising:
   mixing said iron material and said sulfuric acid and said water so as to increase the temperature of the reaction to between 240° F. and 300° F.

6. The process of claim 5, the process of the reaction being between 20 and 90 p.s.i.

7. The process of claim 1, the step of agitating occurring with an application of external heat to said interior of said pressure vessel.

8. The process of claim 1, the step of agitating comprising:
   agitating said iron material and said sulfuric acid and said water for the period of time so as to increase the temperature of the reaction solely by the reaction of said iron material and said sulfuric acid and said water.

9. The process of claim 1, the step of discharging comprising:
   pumping said ferric sulfate from said interior of said pressure vessel; and
   delivering the pumped ferric sulfate to a container exterior of said pressure vessel.

10. The process of claim 1, further comprising:
    introducing water into said interior of said pressure vessel subsequent to or at an end of the reaction so as to dilute said ferric sulfate within said interior of said pressure vessel.

11. The process of claim 1, the step of agitating comprising:
    rotating a blade or an impeller within said interior of said pressure vessel.

12. The process of claim 1, further comprising:
    forming said pressure vessel so as to have an iron material inlet and a water inlet and an acid inlet, the step of introducing said water comprising passing said water through said water inlet and into said interior of said pressure vessel, the step of introducing said iron material comprising passing said iron material through said iron material inlet and into said interior of said pressure vessel, the step of adding said sulfuric acid comprising passing said sulfuric acid through said acid inlet and into said interior of said pressure vessel.

13. The process of claim 12, the step of forming said pressure vessel further comprising:
    jacketing and insulating said pressure vessel.

14. The process of claim 13, the step of jacketing and insulating comprising:
    forming heat exchange lines in heat exchange relationship with said interior of said pressure vessel.

15. The process of claim 14, further comprising:
    passing a heated fluid through said heat exchange lines so as to increase the temperature in said inlet interior of said pressure valve.

16. The process of claim 12, the step of forming said pressure vessel comprising:
    forming said pressure vessel of a corrosion-resistant material that is capable of withstanding pressures of up to 150 p.s.i.g. and temperatures of up to 550° F.

17. The process of claim 1, further comprising:
    venting gases from said interior of said pressure vessel.

18. The process of claim 1, the step of agitating further comprising:
    recycling oxygen back into said interior of said pressure vessel such that recycled oxygen is mixed with said water and said iron material and said sulfuric acid.

19. The process of claim 18, the step of recycling oxygen comprising:

educting the oxygen so as to increase of velocity of the oxygen back towards said interior of said pressure vessel.

20. The process of claim 1, further comprising:

applying external heat to said pressure vessel so as to evaluate the temperature in said interior of said pressure vessel.

\* \* \* \* \*